United States Patent [19]

Wakabayashi et al.

[11] Patent Number: 5,218,421
[45] Date of Patent: Jun. 8, 1993

[54] WAVELENGTH DETECTING APPARATUS

[75] Inventors: Osamu Wakabayashi; Masahiko Kowaka; Yukio Kobayashi, all of Hiratsuka, Japan

[73] Assignee: Kabushiki Kaisha Komatsu Seisakusho, Japan

[21] Appl. No.: 768,730

[22] PCT Filed: Feb. 15, 1991

[86] PCT No.: PCT/JP91/00185
§ 371 Date: Oct. 8, 1991
§ 102(e) Date: Oct. 8, 1991

[87] PCT Pub. No.: WO91/12499
PCT Pub. Date: Aug. 22, 1991

[30] Foreign Application Priority Data

Feb. 15, 1990 [JP] Japan ................................. 2-34503

[51] Int. Cl.[5] .............................................. G01B 9/02
[52] U.S. Cl. ...................................... 356/352; 372/32
[58] Field of Search ................ 356/361, 352, 345; 372/29, 32

[56] References Cited

U.S. PATENT DOCUMENTS 4,289,403 9/1981 Allington .......................... 356/361
4,650,329 3/1987 Barrett et al. ..................... 356/361

FOREIGN PATENT DOCUMENTS

52-103880 8/1977 Japan .
53-9081 1/1978 Japan .
57-25503 6/1982 Japan .
60-72152 4/1985 Japan .
63-7426 2/1988 Japan .
1-183873 7/1989 Japan .
2-307281 12/1990 Japan .

Primary Examiner—Samuel A. Turner
Attorney, Agent, or Firm—Welsh & Katz, Ltd.

[57] ABSTRACT

A wavelength detecting apparatus which assures that the wavelength of a laser light can be detected with accuracy is disclosed. In the subject invention, the temperature of the vapor obtained from an element such as a mercury which contains plural isotopes is elevated in excess of a predetermined temperature so that an emission line of the element becomes plural emission lines. One of the divided emission lines is used as a reference light for the detection of the wavelength of the light to be detected. In addition, a specific isotope of the element may be selected from plural isotopes of a reference element to thereby provide a narrowed emission line for use as a reference light.

23 Claims, 5 Drawing Sheets

WAVELENGTH DETECTING APPARATUS

TECHNICAL FIELD

The present invention relates generally to a wavelength detecting apparatus for detecting the wavelength of a laser light or the like. More particularly, the present invention relates to a wavelength detecting apparatus preferably employable for a case where a narrow-band oscillating excimer laser light unit is used as a light source for an unit for projecting and exposing an image on a reduced scale for the purpose of producing semiconductor devices.

BACKGROUND ART

Attention has been heretofore paid to utilization of an excimer laser light unit to serve as a light source for an unit for projecting and exposing an image on a reduced scale (hereinafter referred to as a stepper) for the purpose of producing semiconductor devices. This is because of the fact that the excimer laser light unit has many excellent advantages that it is possible to expand a limit of light exposure to the range shorter than 0.5 micron because the wavelength of an excimer laser light is short (about 248.4 nm in the case of a KrF laser light), the excimer laser light has a deep focus depth compared with a g line and an i line generated by a conventional mercury lamp under a condition of same resolvability, a small number of lens apertures (NA) is required, the light exposure range can be enlarged, and a large magnitude of power can be produced with the excimer laser light unit.

In a case where the excimer laser light unit is used as a light source for the stepper, it is required that a laser light to be outputted from the excimer laser light unit is oscillated within the narrow-band oscillatory range. In addition, it is required that the wavelength of the output laser light from the excimer laser light unit which has been oscillated within the narrow-band oscillatory range is stabilized while it is controlled at a high accuracy.

Hitherto, a monitor etalon has been used for the purpose of measuring the wavelength line width of a laser light outputted from a narrow-band oscillating excimer laser light unit or the like, and moreover, detecting the wavelength of the same. The monitor etalon is constructed in the form of an air gap etalon including a pair of partially reflecting mirrors arranged opposite to each other with a predetermined gap therebetween. With such construction, the wavelength of the laser light which has permeated through the air gap etalon is represented by the following equation.

$$m\lambda = 2nd \cdot \cos\theta$$

where m designates an integral, d designates a distance between the opposing pair of partially reflecting mirrors constituting the air gap etalon, n designates a refractivity as measured between the opposing pair of partially reflecting mirrors, and $\theta$ designates an angle defined by a normal line of the etalon and an optical axis of an incident light.

With respect to the foregoing equation, it is obvious that $\theta$ varies as the wavelength of the laser light varies, when it is assumed that n, d and are kept constant, respectively. In practice, the wavelength of a light to be detected is practically detected by utilizing the aforementioned nature of the monitor etalon. With the monitor etalon constructed in the above-described manner, however, the above angle $\theta$ varies as a pressure in the air gap and an environmental temperature vary, even though the wavelength of a light to be detected is kept constant. In view of the above fact, when the monitor etalon is used for performing a detecting operation, the wavelength of the light to be detected is practically detected while the pressure in the air gap and the environmental temperature are controllably kept constant.

However, since it is practically difficult to control the pressure in the air gap and the environmental temperature at a high accuracy, the absolute wavelength of the light to be detected can not be detected at a sufficiently high accuracy.

To obviate the foregoing malfunction, a proposal has been made with respect to an apparatus for detecting the absolute wavelength of a light to be detected by inputting the light to be detected as well as a reference light having a known wavelength (e.g., an argon laser light, an oscillation line derived from an iron, an oscillation line generated by a mercury lamp or the like) into a monitor etalon and then detecting a relative wavelength of the light to be detected relative to the reference light.

With this proposed apparatus, the light which has permeated through the etalon is irradiated directly toward the detecting surface of an optical detector such as a CCD image sensor or the like to form an interference fringe on a detecting surface of the optical sensor so that the absolute wavelength of the light to be detected is practically detected based on the position where the interference fringe is detected.

It should be added that a technology using a diffractive grating in place of the monitor etalon is available at present.

However, in a case where a light source for a reference light is arranged independent of a light source for a light to be detected, the absolute wavelength of the light to be detected can not practically be detected at a high accuracy by utilizing the foregoing technology. In detail, when the light source for the reference light is arranged independent of the light to be detected in the above-described manner, there is a possibility that the wavelength of the reference light inputted into a monitor etalon is largely deviated from the wavelength of the light to be detected, e.g., an excimer laser light. For this reason, the absolute wavelength of the light to be detected can not be detected a high accuracy. In addition, also in a case where the wavelength of the reference light is nearly equal to the wavelength of the excimer laser light, it is practically difficult to detect the absolute wavelength of the excimer laser light at a high accuracy when an intensity of the reference light is weak and a wavelength line width of the reference light is widened.

To obviate the above malfunctions, a proposal has been made such that a 253.7 nm oscillation line generated by a low pressure mercury lamp (having a natural mercury vapor enveloped therein) is used as a reference light because a wavelength of 253.7 nm of the above oscillation line is nearly equal to a wavelength of 248.4 nm of a KrF excimer laser light, and moreover, the low pressure mercury lamp has a high light intensity. However, it has been found that this proposal has drawbacks that a wavelength line width of the 253.7 nm oscillation line is wide and the absolute wavelength of a light to be detected can not practically be detected at a high accuracy due to a degraded detection accuracy for detecting each interference fringe.

The present invention has been made in consideration of the foregoing background and its object resides in providing a wavelength detecting apparatus which assures that the absolute wavelength of a light to be detected can practically be detected at a high accuracy by detecting an interference fringe derived from a reference light at a high accuracy wherein an oscillation line obtained from the vapor of a specific element such as a mercury or the like containing plural isotopes is used to serve as the foregoing reference light.

DISCLOSURE OF THE INVENTION

To accomplish the above object, there is provided according to one aspect of the present invention a wavelength detecting apparatus for detecting the wavelength of a light to be detected wherein an oscillation line or emission line obtained from the the vapor of a specific element containing plural isotopes is used as a reference light, wherein the temperature of the vapor is elevated in excess of a predetermined temperature so that the oscillation line is divided into plural oscillation lines, and each of the divided oscillation lines derived from the specific element is used to serve as the foregoing reference light.

In fact, it has been found from results obtained from a series of experiments that in a case where, e.g., a mercury is used as a specific element, when the temperature of a mercury vapor is elevated in excess of a predetermined temperature (about 40° C. representative of the environmental temperature of a mercury lamp), an oscillation line having a wavelength of 253.7 nm is divided into an oscillation line corresponding to a first mercury isotope having a specific mass number (any one of mass numbers 196, 198, 199, 200, 201, 202 and 204) and an oscillation line corresponding to a second mercury isotope having a specific mass number (i.e., a mass number different from that of the first mercury isotope). Each of the divided oscillation lines has a considerably narrow wavelength line width compared with the oscillation line having a wavelength of 253.7 nm. This makes it possible to detect an interference fringe derived from each of the divided oscillation lines at a high accuracy. Consequently, the absolute wavelength of a light to be detected can practically be detected at a high accuracy.

Further, according to other aspect of the present invention, there is provided a wavelength detecting apparatus for detecting the wavelength of a light to be detected wherein an oscillation line obtained from the vapor of a specific element is used as a reference light, wherein a specific isotope contained in the specific element is selected so that a light generated from the vapor of the selected isotope is used to serve as the foregoing reference light.

With the wavelength detecting apparatus constructed in the above-described manner, in a case where, e.g., a mercury is used as the foregoing specific element, when an oscillation line obtained from either one of the first mercury isotope and the second mercury isotope is used as a reference light, it has been found that the oscillation line has a very narrow wavelength line width. This makes it possible to detect the oscillation line at a high accuracy. Consequently, the absolute wavelength of the light to be detected can practically be detected at a high accuracy.

BEST MODE FOR CARRYING OUT THE INVENTION

Now, the present invention will be described in detail hereinafter with reference to the accompanying drawings which illustrate a preferred embodiment of the present invention.

Figure 1:
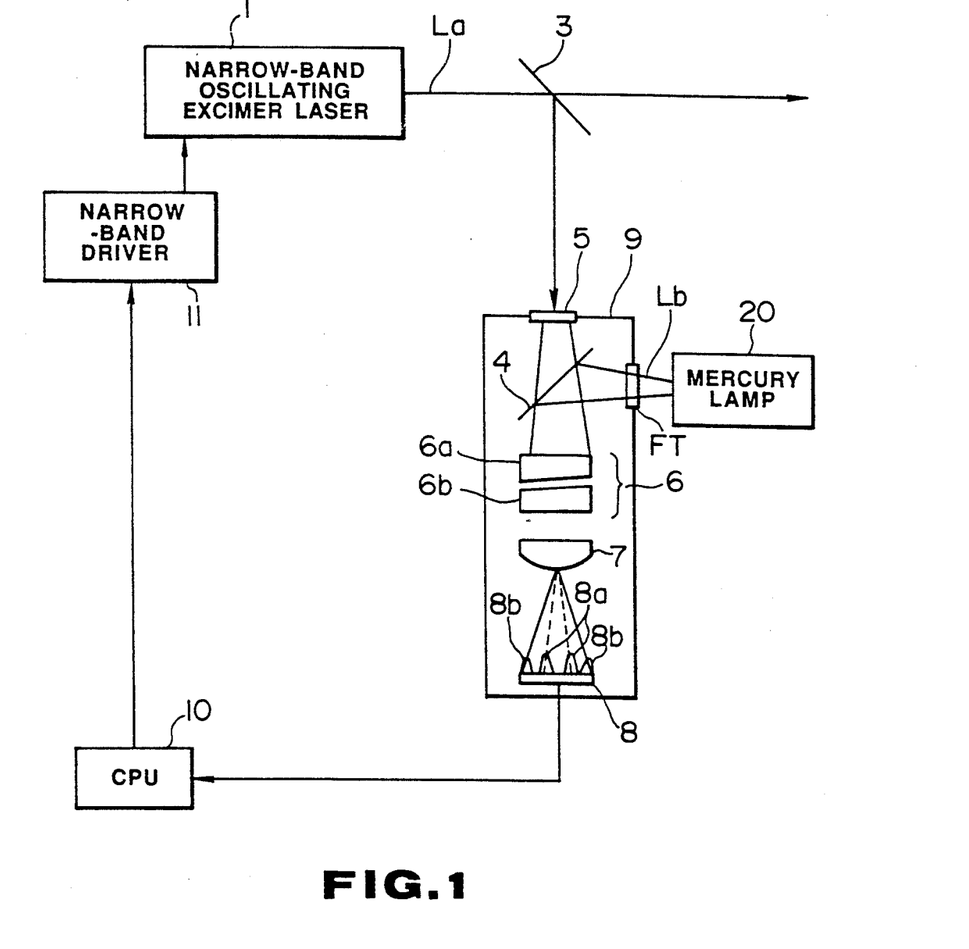
FIG. 1 is an illustrative view which schematically shows by way of example the structure of a wavelength detecting apparatus in accordance with an embodiment of the present invention wherein the apparatus is employed for detecting the wavelength of a laser light outputted from an narrow-band excimer laser light unit.

FIG. 1 is an illustrative view which schematically shows by way of example the structure of a wavelength detecting apparatus in accordance with the embodiment of the present invention. To practice the embodiment of the present invention, a light La outputted from a narrow-band oscillating excimer laser light unit 1 is used as a light to be detected. In the case of this embodiment, it is assumed that a KrF excimer laser light unit is employed for the narrow-band oscillating excimer laser light unit 1.

In addition, a low pressure mercury lamp 22 (see FIG. 2 to FIG. 4) serving as a plane light source is used as a reference light source so that a light generated by the low pressure mercury lamp 22 is emitted through the light emitting port of a mercury lamp portion 20 which will be described later in conjunction with the low pressure mercury lamp 22 as an essential component. As the emitted light passes through an interference filter FT, only a light having a wavelength of 253.7 nm is permitted to permeate through the filter FT. This light having a wavelength of 253.7 nm is a light corresponding to a first mercury isotope having a specific mass number and a second mercury isotope having a different mass number from that of the first mercury isotope each derived from the vapor of a natural mercury (inclusive of respective isotopes of a mercury, i.e., isotopes having mass numbers of 196, 198, 199, 200, 201, 202 and 204) enveloped in the low pressure mercury lamp 22. It should be noted that mass numbers of the first and second mercury isotopes have been not definitely identified at the present experimental stage. For this reason, it is possible to carry out the present invention in such a manner that only the first and second mercury isotopes are previously enveloped in the low pressure mercury lamp 22, provided that the mass numbers of the first and second mercury lamps are identified based on results obtained from experiments. The reason why the low pressure mercury lamp 22 is used as a mercury lamp consists in that the light having a wavelength of 253.7 nm has a high intensity. However, the present invention should not be limited only to the case where the low pressure mercury lamp is used as a mercury lamp.

A part of the laser light outputted from the narrow-band oscillating excimer laser light unit 1 is deflected from a beam splitter 3 in the form of a sampling light which in turn is irradiated toward a frosted glass 5. After the sampling light passes through the frosted glass 5, it is scatteringly irradiated toward a beam splitter 4. On the other hand, the light having a wavelength of 253.7 nm outputted through the light emitting port of the mercury lamp portion 20 is irradiated toward to the reverse surface of the beam splitter 4 as a reference light Lb.

A part of the sampling light La which has been scatteringly irradiated from the frosted glass 5 permeates through the beam splitter 4 and reaches an etalon 6. At the same time, a part of the reference light Lb which has been outputted through the light emitting port of the mercury lamp portion 20 and then has permeated through the filter FT is reflected at the beam splitter 4 and reaches the etalon 6.

The etalon 6 is composed of two transparent plates 6a and 6b of which inside surface serves as a partially reflecting mirror, respectively. Thus, a wavelength of each of the lights which have permeated through the etalon 6 varies corresponding to an incident angle on the etalon 6. To assure that both of the reference light Lb and the excimer laser light La each having a different wavelength permeate through the etalon 6, the etalon 6 is coated with a reflective film by employing a double-wavelength coating process. In a case where the reflective film is formed by using a film molded from a dielectric substance, since a reflectivity of the reference light Lb having a wavelength of 253.7 nm is not largely different from that of the excimer laser light La having a wavelength of 248.39 nm, it is not always necessary to employ the double-wavelength coating process for producing the etalon 6.

The light which has permeated through the etalon 6 is incident on a light collecting lens 7. The light collecting lens 7 is e.g., an achromatic lens which is subjected to chromatic aberration correcting. As the light permeates through such a light collecting achromatic lens as mentioned above, chromatic aberration is corrected properly.

An optical detector 8 is arranged on a focus of the light collecting lens 7. Arrangement of the optical detector 8 in this way makes it possible that the light which has permeated through the light collecting lens 7 builds images on a detection plane of the optical detector 8, one of the images being a first interference fringe 8a corresponding to the wavelength of the reference light and the other one being a second interference fringe 8b corresponding to the wavelength of the light to be detected. Subsequent to detection of the first and second interference fringes 8a and 8b, the optical detector 8 detects a relative wavelength of the wavelength of the light to be detected relative to the wavelength of the reference light and then detects an absolute wavelength of the light to be detected based on a known wavelength of the reference light and the detected relative wavelength.

It should be noted that the optical detector 8 is constructed by using a single dimensional image sensor, a two-dimentional image sensor, a diode array or a position sensitive detector.

After the absolute wavelength of the light to be detected, i.e., the excimer laser light is detected by the optical detector 8, results derived from the detection are outputted to a central processing unit (hereinafter referred to as a CPU) 10. Then, the CPU 10 performs a controlling operation with the aid of a driver 11 for driving a narrow-band oscillatory element in such a manner that an oscillation wavelength of the excimer laser light is unchangeably maintained to assume a preset wavelength (i.e., a target value) by varying an angle of narrow-band oscillatory elements (e.g., two etalons) arranged in the resonator of a laser light tube (not shown).

It has been found from results derived from a series of experiments that when a temperature of the mercury lamp 22, i.e., a temperature of the mercury vapor enveloped in the mercury lamp 22 is elevated in excess of a predetermined temperature (about 40° C. measured as an environmental temperature around the outer periphery of the mercury lamp 22), the first interference fringe corresponding to the 253.7 nm oscillation line is divided into an interference fringe corresponding to the oscillation line derived from the first mercury isotope and an interference fringe corresponding to the oscillation line derived from the second mercury isotope.

Figure 5A:
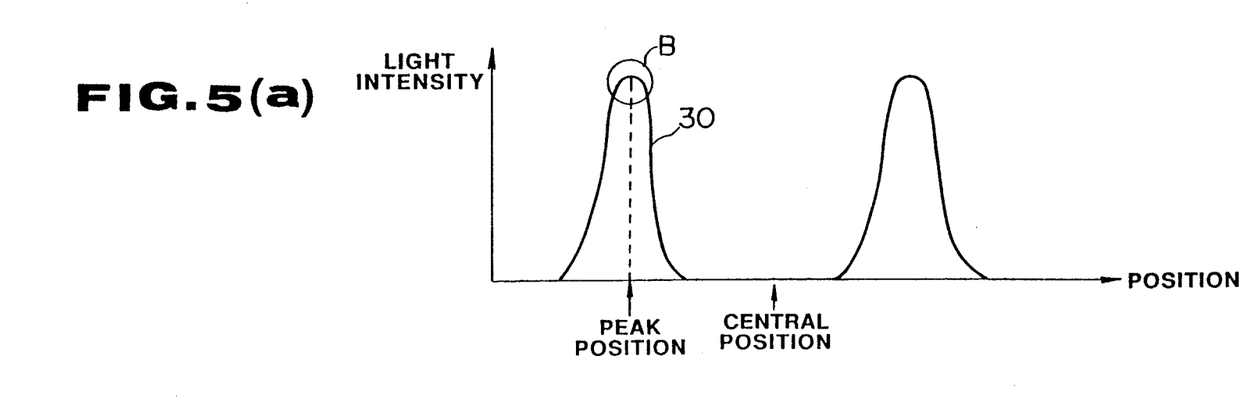
FIG. 5(a) is a graph which shows interference fringes built on an optical detector shown in FIG. 1 in the presence of a reference light generated by a mercury lamp employed for a conventional wavelength detecting apparatus wherein the graph shows a relationship between a position where each interference fringe appears on the optical detector and a light intensity.
Figure 5B:
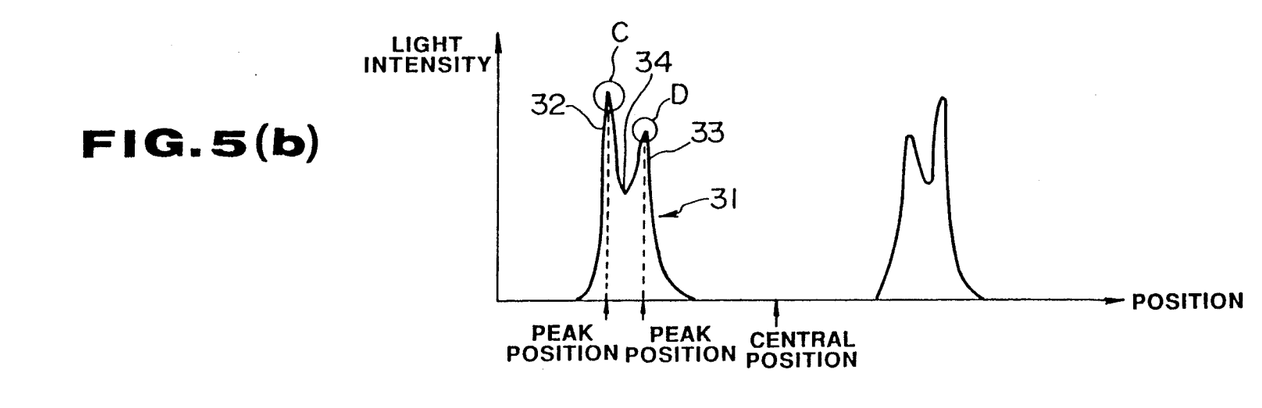
FIG. 5(b) is a graph which shows interference fringes built on the optical detector shown in FIG. 1 in the presence of a reference light generated by a mercury lamp employed for the wavelength detecting apparatus in accordance with the embodiment of the present invention wherein the graph shows a relationship between a position where each interference fringe appears on the optical detector and a light intensity.

FIG. 5 shows two graphs each of which illustrates a relationship between a position on the optical detector 8 and a light intensity. In detail, as shown in FIG. 5(a), in a case where the temperature of the mercury vapor is lower than the predetermined temperature as mentioned above, a curve representing distribution of a light intensity of the interference fringe 8a has a wide mountain 30 of which apex B inclines gradually. Therefore, when a peak position of the apex B is detected by the optical detector 8, it is difficult to accurately detect the peak position of the apex B with the result that a detecting operation is performed with an unacceptable accuracy. On the contrary, as shown in FIG. 5(b), when the temperature of the mercury vapor is elevated in excess of the foregoing predetermined temperature, the interference fringe 8a is divided into an interference fringe corresponding to an oscillation line having a wavelength of 253.65063 nm derived from the first mercury isotope and an interference fringe corresponding to an oscillation line having a wavelength of 253.65277 nm derived from the second mercury isotope, and a curve representing the divided interference fringes exhibits two mountains 32 and 33 each of which has a very narrow width compared with the width of a mountain 31 corresponding to the 253.7 nm oscillation line derived from the interference fringe 8a. In addition, the curve has two apexes C and D each of which inclines very steeply. Thus, peak positions corresponding to the apexes C and D can accurately be seized by detecting the apex C or D using the optical detector 8. As a result, a position detecting accuracy can be improved substantially. Additionally, it is possible to detect the absolute wavelength of the light to be detected based on the position where an interference fringe corresponding to one of the oscillation line having a wavelength of 253.65063 nm and the oscillation line having a wavelength of 253.65277 nm is detected. Alternatively, it is possible to detect the absolute wavelength of the light to be detected based on the positions where two interference fringes corresponding to the both oscillation lines are detected. In a case where two absolute wavelengthes are detected, it is obvious from the viewpoint of a measuring technology that a detection accuracy can be improved much more than the case where the absolute wavelength of the light to be detected is detected with one of the interference fringes as a reference.

Figure 2:
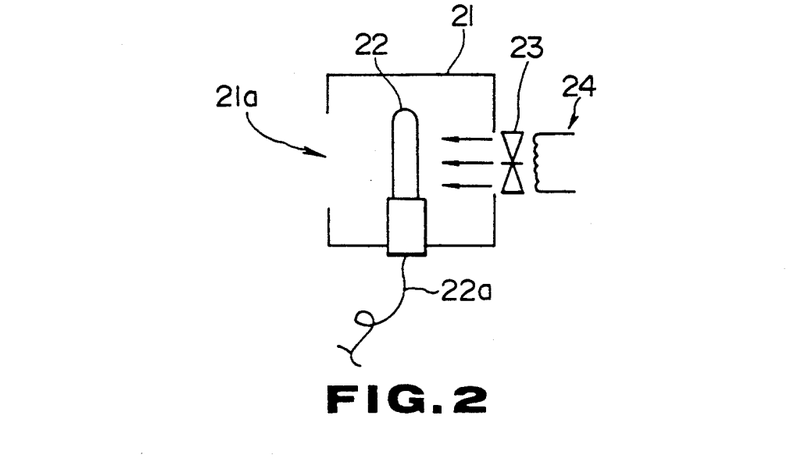
FIG. 2, FIGS. 3(a), 3(b), and FIG. 4 are illustrative views which schematically show the structure of a mercury lamp portion shown in FIG. 1, respectively.
Figure 3A:
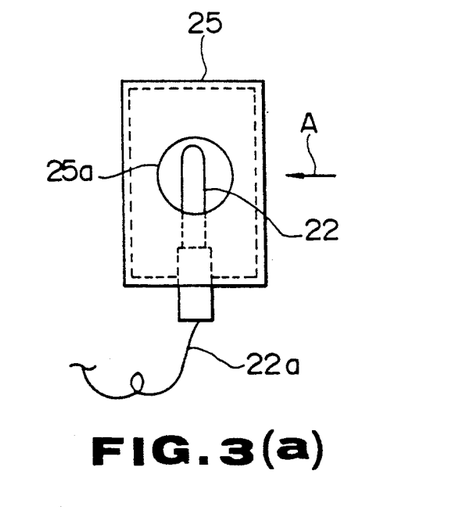
Figure 3B:
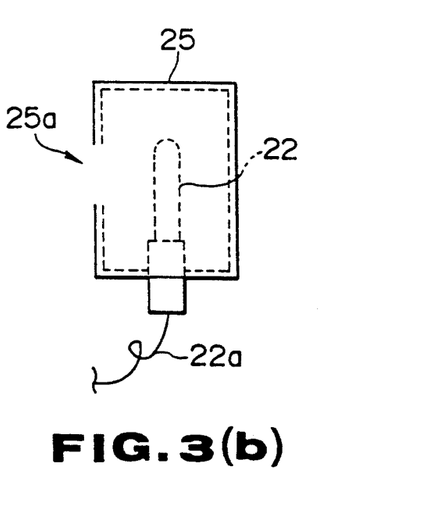
Figure 4:
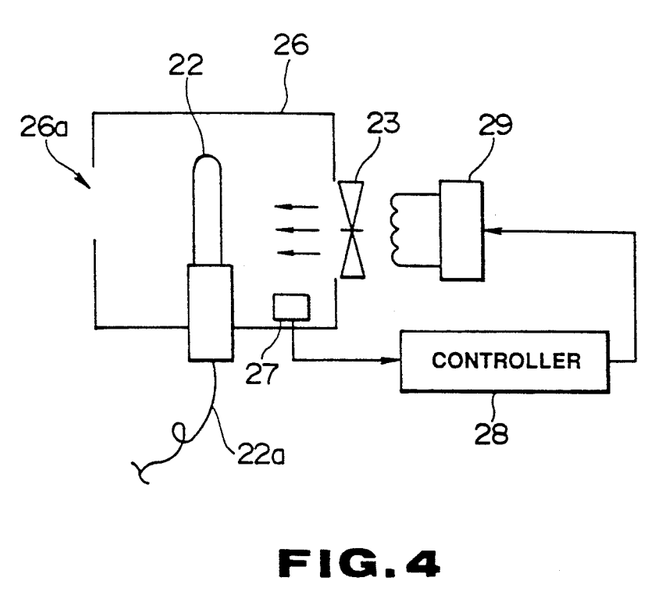

FIG. 2 to FIG. 4 schematically show the structure of the mercury lamp portion 20 which serves to divide the interference fringe by elevating the temperature of the mercury vapor in the above-described manner, respectively. It should be noted that components each exhibiting a common operational function throughout the drawings are designated by same reference numerals for the purpose of convenience of description.

With respect to the mercury lamp portion 20 as shown in FIG. 2, a warm air is blown directly to the mercury lamp 22 in order that the environmental temperature of the mercury lamp 22 is elevated in excess of a predetermined temperature. In detail, the mercury lamp 22 is electrically connected to an electricity supply source via a code 22a, and a housing 21 is arranged peripheral to the mercury lamp 22 while a light emitting port 21a is kept open so as to allow a light generated by the mercury lamp 22 to be emitted to the outside therethrough. A fan 23 for blowing a warm air is mounted on a side wall of the housing 21 located opposite to the side wall having a light emitting port 21a formed thereon, and a heater 24 is additionally arranged behind the fan 23. As the heater 24 is is activated and the fan 23 is rotationally driven, a heat generated by the heater 24 is blown toward the mercury lamp 22 as a warm air in the arrow-marked direction as seen in the drawing.

In addition, with respect to the mercury lamp portion 20 as shown in FIG. 3, to assure that the environmental temperature of the mercury lamp 22 is elevated in excess of a predetermined temperature, a housing 25 (for which an aluminum based alloy is used as a structural material) is arranged while surrounding the mercury lamp 22 with the exception of a light emitting port 25a so as not to allow a heat generated by the mercury lamp 22 to be emitted to an environmental atmosphere. It should be added that FIG. 3(b) is a side view of the housing 25 as seen in the A arrow direction in FIG. 3(a). marked Further, with respect to the mercury lamp portion 20 as shown in FIG. 4, the mercury lamp 22 is covered with a housing 26 including a light emitting port 26a and an air blowing fan 23 in the same manner as the housing 21 shown in FIG. 2. In addition, the mercury lamp portion 20 is provided with a temperature sensor 27 for detecting the environmental temperature of the mercury lamp 22 as well as a controller 28 for controlling an intensity of electric current to be fed to a heater circuit 29 so as to allow the environmental temperature to be maintained at a predetermined temperature (e.g., 40° C.) with an output from the temperature sensor 27 as a feedback signal. With such construction, when the controller 28 is activated, it controls an intensity of electric current to be fed to the heater circuit 29 in such a manner that a difference between the foregoing predetermined temperature and an output from the temperature sensor 27 is reduced to zero, i.e., the environmental temperature of the mercury lamp 22 is equalized to the predetermined temperature. It should be noted that the position assumed by the temperature sensor 27 may be determined arbitrarily, provided that the temperature of a mercury vapor can be detected directly or indirectly. For example, it is recommendable that the temperature sensor 27 is arranged on the surface of the mercury lamp 22 or inside of the same.

Next, a detecting operation to be performed for the reference light and the light to be detected as well as a manner of controlling the wavelength of an excimer laser light with the wavelength detecting apparatus in accordance with the embodiment as shown in FIG. 1 to FIG. 4 will be described below with reference to flow-charts shown in FIG. 6.

Firstly, it is assumed that the mercury lamp portion 20 is constructed as illustrated in FIG. 2. As shown in FIG. 6(a), when an electricity supply source for the low pressure mercury lamp 22 is turned on, the mercury lamp 20 is illuminated (step 101). Next, when an electricity supply source for the heater 24 and the fan 23 is turned on, a warm air is blown toward the mercury lamp 22 (step 102).

Subsequently, the program goes to a step 103 at which the CPU 10 usually determines whether the interference fringe 8a derived from the reference light Lb is divided into two parts (see FIG. 5(b)) or not (see FIG. 5(a)). For example, determination as to whether the interference fringe 8a is divided into two parts in that way or not is practically made in such a manner that values representing light intensities at the mountains 32 and 33 and a value representing a light intensity at a valley 34 are detected by the optical detector 8 and determination is then made based on these values as to whether a difference between the detected value of the mountain 32 and the detected value of the valley 34 exceeds a predetermined threshold or not or whether a difference between the detected value of the mountain 33 and the detected value of the valley 34 exceeds the foregoing predetermined threshold or not.

When the interference fringe 8a is divided into two parts after the temperature of the mercury vapor enveloped in the mercury lamp 22 reaches a predetermined temperature (i.e., a result derived from the determination at the step 103 is YES), the program goes to a step 104. At the step 104, an operator detects the position of each divided interference fringe appearing on the optical detector 8, and the thus detected positions are then stored in the CPU 10. Subsequently, the CPU 10 outputs a signal representing that a preparative work for oscillating the excimer laser light unit 1 is completed (step 104).

Figure 6A:
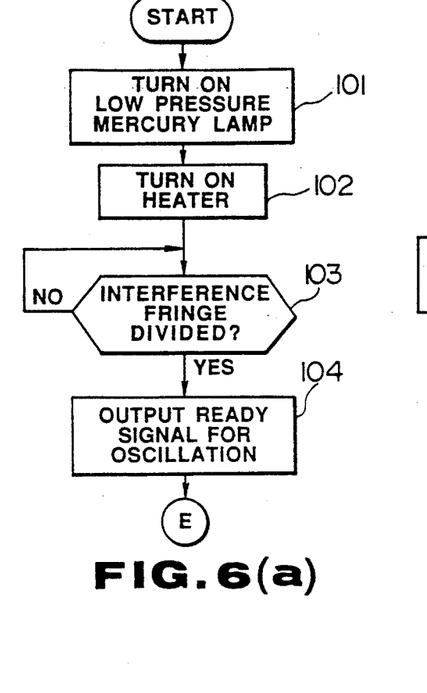
FIG. 6(a), FIG. 6(b) and FIG. 6(c) are flowcharts which show by way example a procedure of processings for detecting an interference fringe in the presence of a reference light, respectively.
Figure 6B:
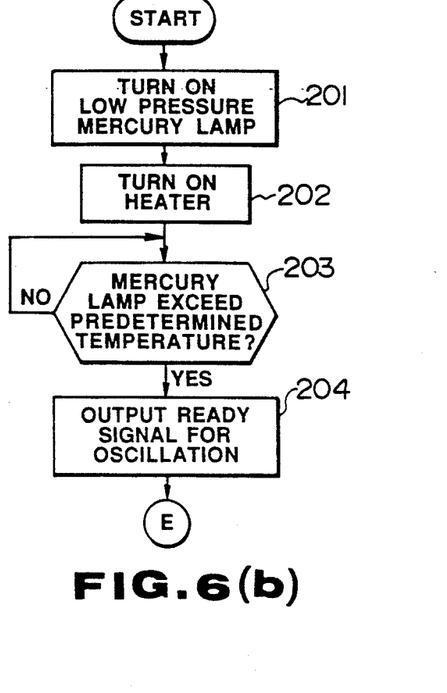
Figures 6C, 6D:
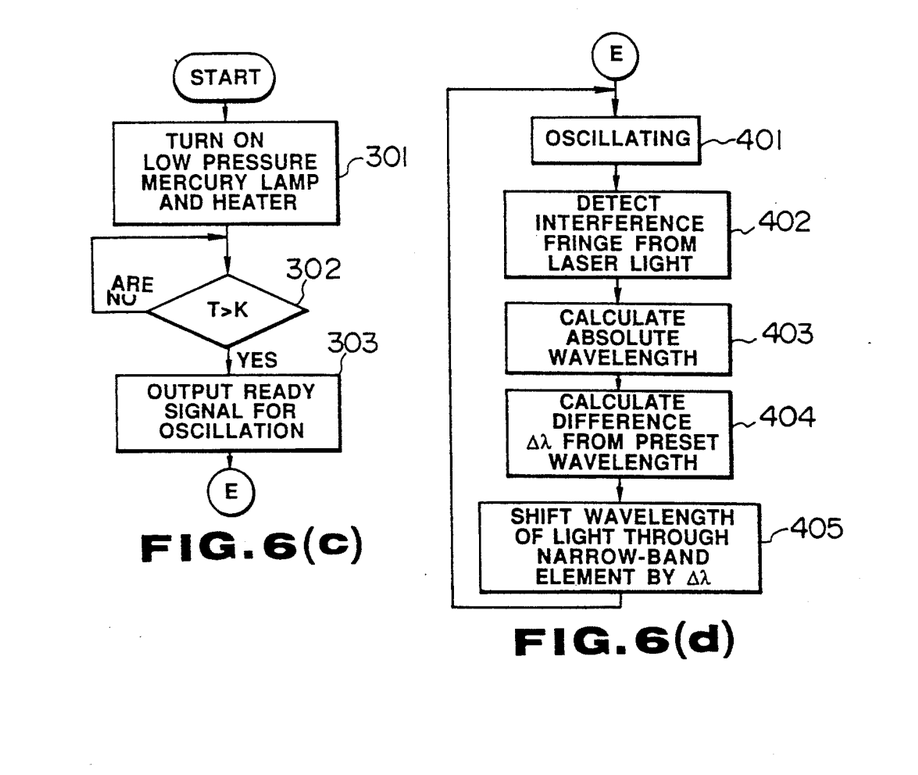
FIG. 6(d) is a flowchart which shows by way of example a procedure of processings for detecting the interference fringe of an excimer laser light, i.e., a light to be detected, oscillating an excimer laser light and controlling the wavelength of the excimer laser light.

Thereafter, the program goes to a step 401 shown in FIG. 6(d) at which the CPU 10 activates the electricity supply source for the excimer laser light unit 1 in response to an output signal at the step 104, whereby a laser light La is oscillated and outputted from the excimer laser unit 1 (step 401). Then, the operator detects the interference fringe 8b of a light to be detected appearing on the optical detector 8 (step 402). Next, the CPU 10 detects an absolute wavelength of the light to be detected by comparing the position of the interference fringe 8b obtained at the step 402 with the positions of the divided interference fringes detected and stored in the CPU 10 at the step 104 (step 403).

After the absolute wavelength of a light to be detected (i.e., an excimer laser light) is detected in the above-described manner, the CPU 10 calculates a difference $\Delta\lambda$ between a preset wavelength (i.e., a target value) and the detected absolute wavelength (step 403). Then, the CPU 10 varies an angle of the etalon arranged in the resonator (not shown) via the narrow-band oscillatory element 11 corresponding to a calculated value of the foregoing difference $\Delta\lambda$. As a result, the wavelength of the excimer laser light which has permeated through the etalon is shifted by a quantity of $\Delta\lambda$ so that the resultant shifted wavelength is unchangeably maintained to assume the foregoing preset wavelength (i.e., a target value) (step 405).

According to the flowchart shown in FIG. 6(a), in response to an output from the optical detector 8, the CPU 10 detects that the interference fringe of the reference light has been divided into two parts, and thereafter, the CPU 10 activates the narrow-band excimer laser light unit 1 to oscillate an excimer laser light. Alternatively, the CPU 10 may detect that the interference fringe has been divided in that way, by detecting that the environmental temperature of the mercury lamp 22 is elevated in excess of a predetermined temperature. Specifically, in a case where the program is executed in conformity with a flowchart as shown in FIG. 6(b), the CPU 10 activates the mercury lamp 22 and the heater 23 at steps 201 and 202 in the same manner as the steps 101 and 102 and then determines whether the environmental temperature of the mercury lamp 22 is elevated in excess of a predetermined temperature (e.g., about 40° C.) (step 203). When the result derived from the determination at the step 203 is YES, the program goes to a step 204 at which the CPU 10 outputs a signal representing that a preparative work has been conducted to oscillate an excimer later light, in the same manner as at the step 104. Subsequent to the step 204, the CPU 10 executes the same processings for oscillating an excimer laser light and controlling the wavelength of the excimer laser light as those at the steps 401 to 405 as mentioned above. To this end, it is recommendable that a desired temperature sensor is arranged at a predetermined location in the housing 21 so as to detect the environmental temperature of the mercury lamp 22.

Alternatively, the CPU 10 may detect that the interference fringe of the reference light has been divided in the above-described manner, by properly performing a time controlling operation. Specifically, as shown in FIG. 6(c), the CPU 10 activates the mercury lamp 22 and the heater 23 at a step 301 in the same manner as at the steps 101 and 102. At the same time when the mercury lamp 22 and the heater 23 are activated, operation of a timer (not shown) is started. Then, the CPU 10 investigates whether a value T derived from a counting operation of the timer is larger than a preset time K (e.g., about five minutes) or not (step 302). When it is found that the value T is larger than the preset value K (i.e., the result derived from the determination at the step 302 is YES), the CPU 10 determines that the interference fringe of the reference light has been divided into two parts and then outputs a signal representing that a preparative work has been conducted for oscillating an excimer laser light in the same manner as at the step 104 (step 303). Thereafter, the CPU 10 executes the same processings for oscillating an excimer laser light and controlling the wavelength of the excimer laser as those at the steps 401 to 405.

Also in a case where the mercury lamp portion 20 is constructed as illustrated in FIG. 3, it is possible to employ the respective flowcharts shown in FIG. 6 for the CPU 10. In this case, it should be noted that a processing for activating the heater 24 at the step 102, the step 202 or the step 301 can be eliminated. In addition, also in a case where the mercury lamp portion 20 is constructed as illustrated in FIG. 4, the respective flowcharts shown in FIG. 6 can be employed for the CPU 10. In this case, it should be noted that it is required that the CPU 10 executes a processing for activating the controller 28 and the heater circuit 28 in place of a processing for activating the heater 24 at the step 102, the step 202 or the step 301.

With respect to the flowcharts shown in FIG. 6, since it is difficult to simultaneously detect interference fringes derived from the a reference light (i.e., a 253.65063 nm oscillation line or a 253.65277 nm oscillation line oscillated by the mercury lamp 22) and the light to be detected (i.e., a KrF narrow-band excimer laser light having a wavelength of 248.4 nm) because the wavelength of the reference light is nearly equal to the wavelength of the light to be detected, the CPU 10 is operated such that interference fringes (divided interference fringes) of the reference light are first detected, and thereafter, an excimer laser light is oscillated to detect an interference fringe derived from the excimer laser light. Instead of separate detection of the interference fringes derived from the reference light and the light to be detected, the CPU 10 may execute a series of processings for simultaneously detect the interference fringes derived from the both lights under a certain circumstance.

According to the aforementioned embodiment of the present invention, the temperature of the mercury lamp 22 is elevated so as to allow the interference fringe 8a to be divided into an interference fringe corresponding to the first mercury isotope and an interference fringe corresponding to the second mercury isotope. However, in view of the fact that all things to be done are to build a mountain 32 or a mountain 33 having a narrow wavelength line width as shown in FIG. 5(b), the present invention may be carried out in such a manner that only one of the first mercury isotope and the second mercury isotope is enveloped in the mercury lamp 22. It is recommendable that identification of the first mercury isotope and the second mercury isotope is achieved by investigating a wavelength line width with respect to an oscillation line derived from each of the mercury isotopes having mass numbers of 196, 198, 199, 200, 201, 202 and 204 and then selectively picking up two isotopes each having a narrow wavelength line width from the respective mercury isotopes. With the thus selected isotopes, a mountain 32 or a mountain 33 as illustrated in FIG. 5(b) is built without any necessity for the aforementioned arrangement for elevating the temperature of the mercury lamp 22 (as shown in FIG. 2 to FIG. 4). Once the isotopes are selected in that way, they make it possible to detect the peak position of one of the mountains at an excellent accuracy, and moreover, detect the absolute wavelength of the excimer laser light with a high accuracy in the same manner as the aforementioned embodiment of the present invention.

According to this embodiment of the present invention, the position of each interference fringe is detected.

Alternatively, the absolute wavelength of the light to be detected may be determined by detecting a diameter or a radius of each interference fringe.

In addition, according to the aforementioned embodiment of the present invention, the achromatic lens which has been subjected to chromatic aberration correcting is used as a light collecting lens 7 so that the position where an image representative of the reference light is built coincides with the position where an image representative of the light to be detected is built. Alternatively, arrangement may be made such that the collecting lens 7 or the optical detector 8 is displaced in the direction of an optical axis so as to absorb the positional difference between the position where the image of the reference light is built and the position where the image of the light to be detected is built.

Additionally, according to the embodiment of the present invention, since the wavelength of the reference light is nearly equal to the wavelength of the light to be detected, arrangement may be made such that a lens which is not subjected to chromatic aberration correcting is used for the light collecting lens 7 while a detecting accuracy higher than a predetermined level is maintained.

Further, according to the embodiment of the present invention, it is assumed that the light to be detected is a KrF excimer laser light. However, the present invention should not be limited only to this. Of course, there is a possibility that an ArF excimer laser light is used as a light to be detected so as to carry out the present invention. In this case, it is recommendable that a light collecting lens which is subjected to color aberration correcting not only for a wavelength of 193 nm (ArF excimer laser light) but also for a wavelength of 253.65063 nm (or 253.65277 nm) is used for the light collecting lens 7, and moreover, the monitor etalon 6 is subjected to coating treatment for the purpose of reflecting a light having a wavelength of 193 nm and a light having a wavelength of 253.65063 nm (or 253.65277 nm). This arrangement assures that the absolute wavelength of the ArF excimer laser light can be detected at a high accuracy.

While the present invention has been described above with respect to the embodiment wherein the 253.7 nm oscillation line is divided into a 253.65063 nm oscillation line derived from the first mercury isotope and a 253.65277 nm oscillation line derived from the second mercury isotope when the temperature of a mercury vapor is elevated in excess of a predetermined temperature, it should of course be understood that the present invention should not be limited only to this embodiment but any kind of mercury isotope may be employed for carrying out the present invention, provided that it is proven that the 253.7 nm oscillation line can be divided in oscillation lines each having a narrow wavelength line width.

In addition, according to the aforementioned embodiment of the present invention, it is assumed that a mercury is employed as a specific element with which an oscillation line having a narrow wavelength line width is obtainable. However, the present invention should not be limited only to the mercury. Alternatively, any other element may be employed, provided that it has the same properties as those of the mercury.

INDUSTRIAL APPLICABILITY

As will be apparent from the above description, according to the present invention, in a case where an oscillation line derived from the vapor of a specific element such as a mercury having plural isotopes is used as a reference light, the foregoing oscillation line is divided into two oscillation lines each having a narrow wavelength line width each of which in turn is employed as a reference light. Consequently, an interference fringe derived from the reference light can be detected with a high accuracy whereby the absolute wavelength of a light to be detected can be detected with a high accuracy.

Thus, when the wavelength detecting apparatus of the present invention is installed in a narrow-band oscillating excimer laser unit, the wavelength of an excimer laser light can be detected at an excellent accuracy. In addition, the wavelength of the oscillated light can be stabilized with a high accuracy.

We claim:

1. A wavelength detecting apparatus for detecting the wavelength of a light to be detected wherein an emission line obtained from the vapor of a specific element containing plural isotopes is used as a reference light, characterized in that
the temperature of said vapor is elevated in excess of a predetermined temperature so that said emission line is divided into plural emission lines, and each of said divided emission lines derived from said specific element is used to serve as said reference light.

2. The wavelength detecting apparatus as claimed in claim 1, characterized in that said specific element is a mercury and that said divided emission lines derived from said specific element comprise an emission line corresponding to a first mercury isotope having a specific mass number and an emission line corresponding to a second mercury isotope having a different mass number from that of said first mercury isotope.

3. The wavelength detecting apparatus as claimed in claim 1, characterized in that the wavelength detecting apparatus includes an etalon through which said reference light and said light to be detected transmit, a focusing lens on which said reference light and said light to be detected both of which have transmitted through said etalon are incident, and an optical detector arranged such that a focus surface of said focusing lens positively coincides with a detecting surface of said optical detector so that a first interference fringe corresponding to said reference light and a second interference fringe corresponding to said light o be detected are formed on said detecting surface of said optical detector by allowing said reference light and said light to be detected irradiated from said focusing lens to build their images on said detecting surface of said optical detector, wherein said first interference fringe and said second interference fringe are detected by said optical detector by allowing said reference light and said light to be detected to be incident on said etalon so that a wavelength of said light to e detected is detected based on a relative wavelength of said light to be detected relative to said reference light as well as a known wavelength of said reference light, said relative wavelength being obtained from results derived from said detecting operation performed by said optical detector.

4. The wavelength detecting apparatus as claimed in claim 3, characterized in that the time when said reference light is incident on said etalon and the time when said light to be detected is incident on said etalon differ from each other so that said first interference fringe and said second interference fringe to be detected by said optical detector are detected at a time different from each other, respectively.

5. The wavelength detecting apparatus as claimed in claim 4, characterized in that elevation of the temperature of said vapor is started and incidence of a light emitted from said vapor on said etalon is started to detect said first interference fringe by said optical detector when the temperature of said vapor reaches a predetermined temperature, and thereafter, incidence of said light to be detected on said etalon is started to detect said second interference fringe by said optical detector and, on the basis of the detected results of said first and second interference fringes, the wavelength of said light to be detected is calculated.

6. The wavelength detecting apparatus as claimed in claim 4, characterized in that elevation of the temperature of said vapor is started and incidence of a light emitted from said vapor on said etalon is started to detect said first interference fringe by said optical detector when a predetermined time elapses from the time when elevation of the temperature of said vapor has been started, and thereafter, incidence of said light to be detected on said etalon is started to detect said second interference fringe by said optical detector and, on the basis of the detected results of said first and second interference fringes, the wavelength of said light to be detected is calculated.

7. The wavelength detecting apparatus as claimed in claim 4, characterized in that elevation of the temperature of said vapor is started and incidence of a light emitted from said vapor on said etalon is started to detect each of said divided interference fringes as the first interference fringe when division of said interference fringes is detected by said optical detector, and thereafter, incidence of said light to be detected on said etalon is started to detect the second interference fringe by said optical detector and, on the basis of the detected results of the first and second interference fringes, the wavelength of said light to be detected is calculated.

8. The wavelength detecting apparatus as claimed in claim 2, characterized in that a mercury lamp having a mercury vapor enveloped therein is received in a housing while a part of said housing serving as a light emitting port is kept opened so as to allow a light generated by said mercury lamp to be emitted to the outside through said light emitting port, whereby the temperature of said mercury vapor is elevated in excess of said predetermined temperature by turning on said mercury lamp.

9. The wavelength detecting apparatus as claimed in claim 2, characterized in that the wavelength detecting apparatus further includes heating means for heating a mercury lamp having a mercury vapor enveloped therein so that the temperature of said mercury vapor is elevated in excess of said predetermined temperature.

10. The wavelength detecting apparatus as claimed in claim 1, characterized in that said light to be detected is an excimer laser light oscillated by a narrow-band oscillating excimer laser unit, and that the wavelength detected by the wavelength detecting apparatus is used for a controlling operation to be performed so as to allow the wavelength of said excimer laser light oscillated in said narrow-band oscillating excimer laser light unit to be unchangeably maintained to assume a preset wavelength.

11. A wavelength detecting apparatus for detecting the wavelength of a light to be detected wherein an emission line obtained from vapor of a specific element is used as a reference light, characterized in that the temperature of the mixed vapor of a plurality of isotopes is elevated in excess of a predetermined temperature so that emission lines from said mixed vapor of said plurality of isotopes are divided into an emission line corresponding to a specific isotope and emission lines corresponding to isotopes other than said specific isotope, an element of which wavelength line width of the emission line corresponding to said specific isotope becomes smaller than wavelength line width of the emission lines from the mixed vapor before the elevation of the temperature is selected as said specific element, only the vapor of said specific isotope contained in the selected specific element is enclosed into a lamp, and the emission line emitted from said lamp is used to serve as said reference light.

12. The wavelength detecting apparatus as claimed in claim 11, characterized in that said specific element is mercury and an isotope of said mercury having a specific mass number is enclosed with low pressure in said lamp.

13. The wavelength detecting apparatus as claimed in claim 11, characterized in that the wavelength detecting apparatus includes an etalon through which said reference light and said light to be detected transmit, a focusing lens on which said reference light and said light to be detected both of which have transmitted through said etalon are incident, and an optical detector arranged such that a focus surface of said focusing lens positionally coincides with a detecting surface of said optical detector so that a first interference fringe corresponding to said reference light and a second interference fringe corresponding to said light to be detected are formed on said detecting surface of said optical detector by allowing said reference light and said light to be detected irradiated from said focusing lens to build their images on said detecting surface of said optical detector, wherein said first interference fringe and said second interference fringe are detected by said optical detector by allowing said reference light and said light to be detected to be incident on said etalon so that the wavelength of said light to be detected is detected based on a relative wavelength of said light to be detected relative to said reference light as well as a known wavelength of said reference light, said relative wavelength being obtained from results derived from said detecting operation performed by said optical detector.

14. The wavelength detecting apparatus as claimed in claim 13, characterized in that the time when said reference light is incident on said etalon and the time when said light to be detected is incident on said etalon differ from each other so that said first interference fringe and said second interference fringe to be detected by said optical detector are practically detected at a time different from each other, respectively.

15. The wavelength detecting apparatus as claimed in claim 11, characterized in that said light to be detected is an excimer laser light oscillated in a narrow-band oscillating excimer laser unit, and that the wavelength detected by the wavelength detecting apparatus is used for a controlling operation to be performed so as to allow the wavelength of said excimer laser light oscillated by said narrow-band oscillating excimer laser light unit to be unchangeably maintained to assume a preset wavelength.

16. The wavelength detecting apparatus as claimed in claim 1, characterized in that the temperature of said vapor is controlled to a constant temperature.

17. The wavelength detecting apparatus as claimed in claim 1, characterized in that said specific element is mercury, and said divided emission line derived from said specific isotope comprises an emission line having a wavelength of 253.7 nm emitted from a low-pressure mercury lamp.

18. The wavelength detecting apparatus as claimed in claim 1, characterized in that said reference light and said light to be detected are allowed to transmit through an etalon, and said reference light and said light to be detected which have transmitted said etalon are further allowed to transmit through a focusing lens so that a first interference fringe corresponding to said reference light and a second interference fringe corresponding to said light to be detected, both building their images on a focus surface of said focusing lens, are detected by an optical detector and, the wavelength of said light to be detected is detected on the basis of a relative wavelength of said light to be detected relative to said reference light as well as a known wavelength of said reference light, said relative wavelength being obtained from results derived from said detection operation performed by said optical detector.

19. The wavelength detecting apparatus as claimed in claim 2, characterized in that part of a narrow-band oscillating excimer laser light output is used as said light to be detected, and on the basis of the wavelength detected by the wavelength detecting apparatus, feedback control is carried out so that a wavelength of said narrow-band oscillating excimer laser light becomes a target value.

20. The wavelength detecting apparatus as claimed in claim 11, characterized in hat said reference light and said light to be detected are allowed to transmit through an etalon and said reference light and said light to be detected which have transmitted said etalon are further allowed to transmit through a focusing lens so that a first interference fringe corresponding to said reference light and a second interference fringe corresponding to said light to be detected both building their images on a focus surface of said focusing lens are detected by an optical detector and, the wavelength of said light to be detected is detected on the basis of a relative wavelength of said light to be detected relative to said reference light as well as a known wavelength of said reference light, said relative wavelength being obtained from results derived from said detection operation performed by said optical detector.

21. The wavelength detecting apparatus as claimed in claim 12, characterized in that part of a narrow-band oscillating excimer laser light output is used as said light to be detected, and on the basis of the wavelength detected by the wavelength detecting apparatus, feedback control is carried out so that a wavelength of said narrow-band oscillating, excimer laser light becomes a target value.

22. The wavelength detecting apparatus as claimed in claim 12, characterized in that said mercury isotope having the specific mass number and being enclosed in said lamp is selected from the group consisting of $^{202}$Hg, $^{200}$Hg, $^{199}$Hg and $^{198}$Hg.

23. The wavelength detecting apparatus as claimed in claim 22, characterized in that part of a narrow-band oscillating excimer laser light output is used as said light to be detected, and on the basis of the wavelength detected by the wavelength detecting apparatus, feedback control is carried out so that a wavelength of said narrow-band oscillating excimer laser light becomes a target value.

* * * * *